United States Patent [19]

Kurata et al.

[11] Patent Number: 4,602,523
[45] Date of Patent: Jul. 29, 1986

[54] STEERING SYSTEM EQUIPPED WITH ANTI-ROTATION MECHANISM

[75] Inventors: Hidenori Kurata, Zama; Michiyoshi Takahara, Yokohama, both of Japan

[73] Assignee: Nissan Motor Company, Ltd., Japan

[21] Appl. No.: 653,607

[22] Filed: Sep. 19, 1984

[30] Foreign Application Priority Data

Sep. 27, 1983 [JP] Japan .............................. 58-149325[U]
Oct. 11, 1983 [JP] Japan .............................. 58-189611

[51] Int. Cl.⁴ .......................... B62D 1/04; B62D 1/16
[52] U.S. Cl. ................................... 74/484 R; 29/464;
74/409; 74/492; 74/552; 200/61.54; 403/27
[58] Field of Search ............... 74/409, 484 R, 492, 74/552; 200/61.54, 61.57; 29/464; 403/27

[56] References Cited

U.S. PATENT DOCUMENTS

| 3,704,449 | 11/1972 | Hutchins | 74/409 X |
| 4,066,356 | 1/1978 | Parker | 74/409 X |
| 4,098,072 | 7/1978 | Brouwer | 74/409 X |

FOREIGN PATENT DOCUMENTS

| 13961 | 6/1911 | France | 403/27 |
| 49-17167 | 4/1974 | Japan | 74/484 R |
| 57-191654 | 4/1982 | Japan | |

Primary Examiner—Allan D. Herrmann
Attorney, Agent, or Firm—Lowe, Price, LeBlanc, Becker & Shur

[57] ABSTRACT

A pair of pinions are mounted on a hub portion of a steering wheel in a manner to be movable toward and away from a pair of matched internal gears. The pinions are urged by a pair of leaf springs toward the internal gears to eliminate backlash therebetween.

2 Claims, 7 Drawing Figures

STEERING SYSTEM EQUIPPED WITH ANTI-ROTATION MECHANISM

BACKGROUND OF THE INVENTION

1. Field of the Invention

The present invention relates in general to steering systems for road vehicles and more particularly to a steering system of the type equipped with an anti-rotation mechanism for holding a steering wheel center pad or the like stationary irrespective of rotation of a steering wheel.

2. Description of the Prior Art

A steering system equipped with such an anti-rotation mechanism includes a pair of internal gears one of which is fixed to a jacket or column of a steering column assembly and the other is adapted to slip on a hub of a steering wheel and mount thereon a steering wheel center pad, and a pair of pinions mounted on a common shaft for rotation therewith and meshing with the internal gears. In this kind of steering system, it is desirable to prevent relative angular movement between the internal gears and the pinions since such movement causes play of the steering wheel center pad. To meet this requirement, there has been proposed a steering system in which a pair of resilient or elastic rollers mounted on a common shaft and adapted to be forcedly in contact with the inner cylindrical surfaces of the internal gears are utilized to frictionally hold one of the internal gears relative to the other as is disclosed in the Japanese Provisional Utility Model Publication No. 57-191654. While the above steering system has accomplished its desired objective, it has not proved entirely satisfactory since it requires a relatively large number of manufacturing and assembling processes and therefore a relatively expensive manufacturing and assembling cost.

SUMMARY OF THE INVENTION

In accordance with the present invention, there is provided an improved steering system which comprises as usual a stationary column, a steering shaft concentrically surrounded by the column, a steering wheel having a hub portion fixed to the steering shaft for rotation therewith, a pair of internal gears one of which is provided to the hub portion of the steering wheel in a manner to be rotatable relative thereto and the other is provided to the upper end portion of the column in a fixed relation thereto, a pinion shaft, and a pair of pinions mounted on the pinion shaft for rotation therewith.

In accordance with the present invention, the steering system further comprises mounting means for mounting the pinion shaft on the hub portion of the steering wheel in a manner to allow the pinions to mesh with the internal gears while allowing the former to be movable toward and away from the latter, and spring means for resiliently urging the pinions toward the inernal gear to eliminate backlash therebetween.

This structure is quite effective in overcoming the disadvantages noted above.

It is accordingly an object of the present invention to provide an improved steering system of the type having an anti-rotation mechanism which is quite simple in structure and quite easy to assemble while being capable of holding a steering wheel center pad without any play.

BRIEF DESCRIPTION OF THE DRAWINGS

The features and advantages of the steering system according to the present invention will become more clearly appreciated from the following description taken in conjunction with the accompanying drawings, in which.

DETAILED DESCRIPTION OF THE PREFERRED EMBODIMENT

Figure 1:
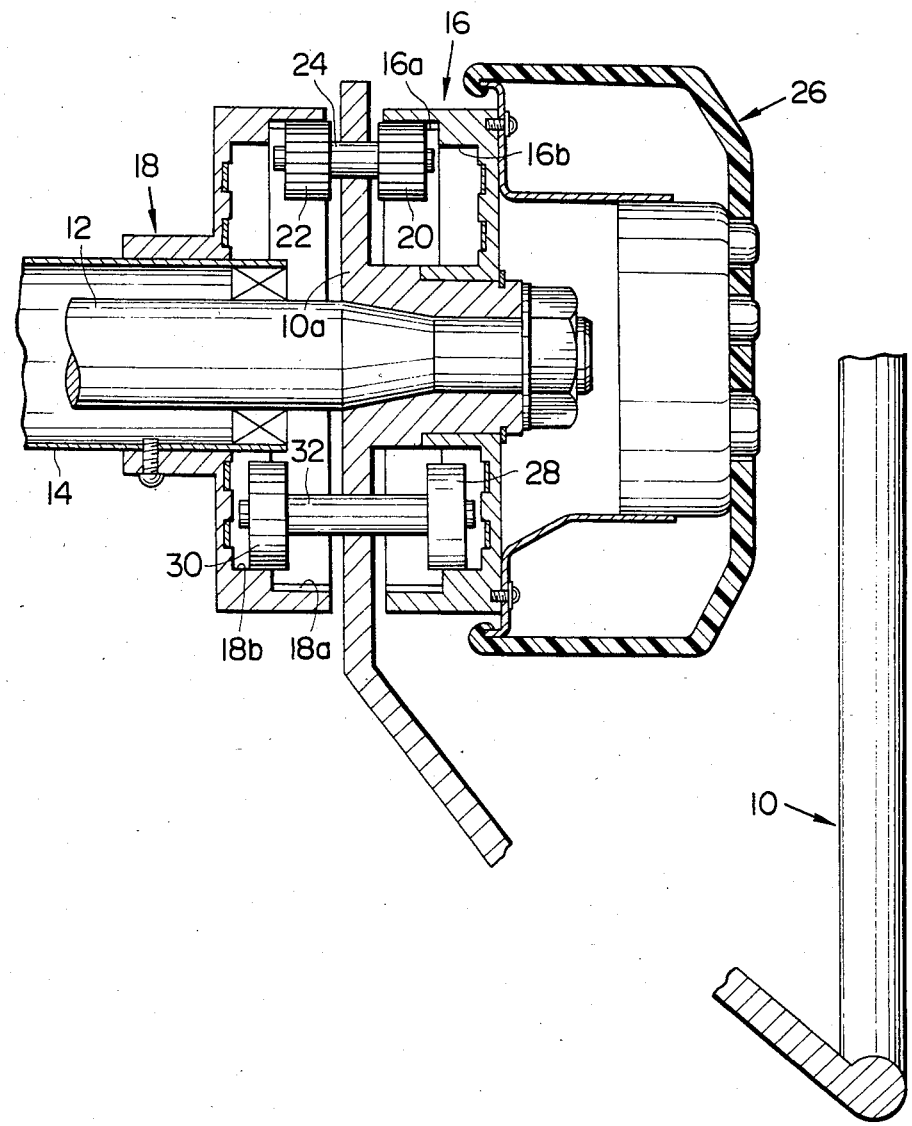
FIG. 1 is a fragmentary sectional view of a prior art steering system equipped with an anti-rotation mechanism.

Referring to FIG. 1, description is first made to a prior art steering system disclosed in the foregoing Japanese Provisional Utility Model Publication for a better understanding of the inventive step of the present invention.

In FIG. 1, a steering wheel is generally designated by the reference numeral 10 and mounted at its hub portion 10a on the upper end portion of a steering shaft 12 for rotation therewith. The steering shaft 12 is concentrically surrounded by a jacket or column 14. On the hub portion 10a of the steering wheel 10 there is rotatably mounted an internal gear 16, while on the upper end portion of the column 14 there is fixedly mounted another internal gear 18. The internal gears 16 and 18 are of the same pitch circle diameter and diametral pitch and axially aligned with each other. The internal gears 16 and 18 are respectively meshed with pinions 20 and 22 which are mounted on a common pinion shaft 24 for rotation therewith. The pinion shaft 24 is rotatably mounted on the steering wheel 10 so that rotation of the steering wheel 10 causes the pinions 20 and 22 to simultaneously rotate and turn about the steering shaft 12, thus allowing the internal gear 16 to be held stationary relative to the column 14. A steering wheel center pad 26 is mounted on the intnernal gear 16 and is thus held stationary irrespective of rotation of the steering wheel 10.

The internal gear 16 has next to its teeth 16a a concentric inner cylindrical surface 16b which is smaller in diameter than the addendum circle of the teeth 16a. Similarly, the internal gear 18 has next to its teeth 18a a concentric inner cylindrical surface 18b. A pair of resilient or elastic rollers 28 and 30 are provided which are mounted on a common roller shaft 32 for rotation therewith, which roller shaft 32 is in turn rotatably mounted on the steering wheel 10. The rollers 28 and 30 are adapted to be forcedly in contact with the inner cylindrical surfaces 16b and 18b of the internal gears 16 and 18 and frictionally hold the internal gear 16 relative to the internal gear 18.

While the above structure has accomplished its desired objective of preventing relative movement between the internal gears 16 and 18 and thereby preventing play of the steering wheel center pad 26, it has not proved entirely satisfactory since it requires a relatively large number of manufacturing and assembling processes and therefore a relatively expensive manufacturing and assembling cost due to the provision of the rollers 28 and 30, roller shaft 32, inner cylindrical surfaces 16b and 18b and so on.

Such disadvantages and shortcomings of the prior art steering system can be overcome by the present invention which will be described hereinafter with reference to FIGS. 2 to 7.

Figure 2:
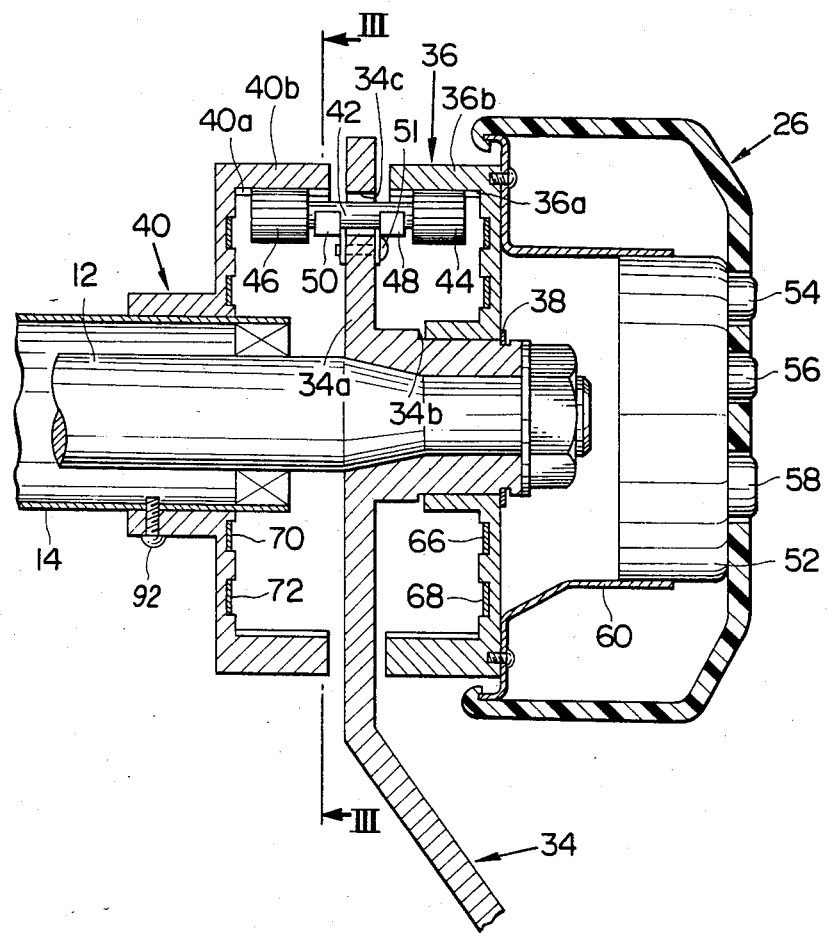
FIG. 2 is a view similar to FIG. 1 but showing a steering system according to an embodiment of the present invention.
Figure 3:
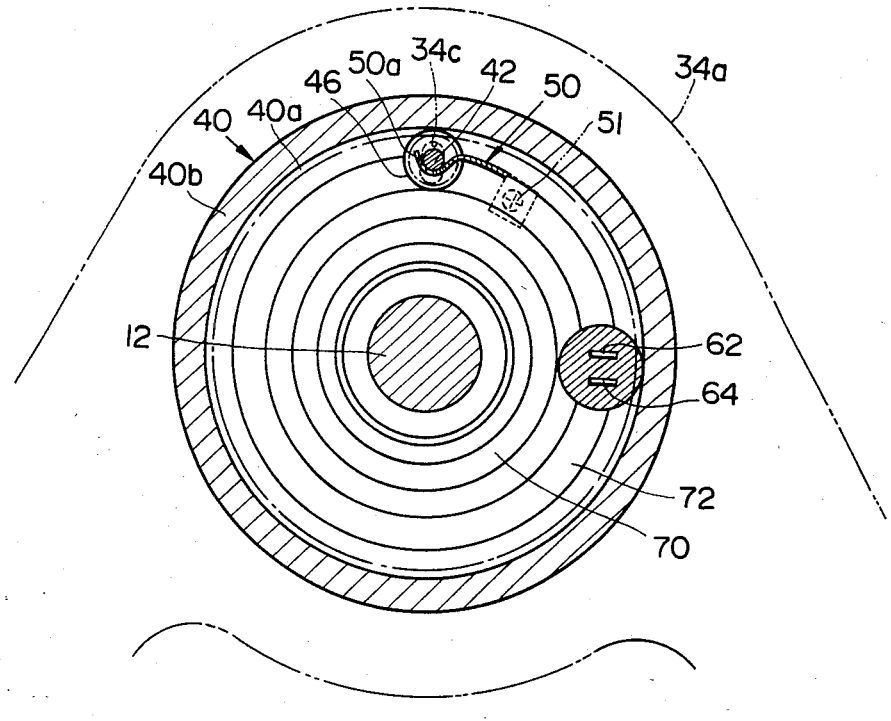
FIG. 3 is a sectional view taken along the line III—III of FIG. 2.

Referring first to FIGS. 2 and 3 in which parts like or corresponding to those of the prior art steering system of FIG. 1 are designated by the same reference numerals as their corresponding parts.

In the drawings, a steering wheel is generally designated by the reference numeral 34 and mounted at its hub portion 34a on the upper end portion of a steering shaft 12 for rotation therewith. The steering shaft 12 is concentrically surrounded by a jacket or column 14 which is supported on a vehicle body by means of a column bracket or the like though not shown in the drawing. On the hub portion 34a of the steering wheel 34 there is rotatably mounted an internal gear 36 which is held axially in place by means of a shoulder 34b in the hub portion 34a and a snap ring 38 fitted in same, while on the upper end portion of the column 14 there is mounted another internal gear 40 which is fixed thereto by means of a screw 92. The internal gear 36 is formed with its teeth 36a substantially throughout the width of the internal surface of its rim 36b. Similarly, the internal gear 40 is formed with its teeth 40a substantially throughout the width of the inner surface of its rim 40b. The internal gears 36 and 40 are of the same pitch circle diameter and diametral pitch and axially aligned with each other.

The steering wheel 34 is formed at the hub portion 34a with a pinion shaft accommodating hole 34c which is elongated radially of the steering wheel 34 as best shown in FIG. 3. In the hole 34c there is mounted a pinion shaft 42 in such a manner as to be rotatable and shiftable in the longitudinal direction of the hole 34c, i.e., movable in the radial direction of the steering wheel 34. A pair of pinions 44 and 46 are mounted on the pinion shaft 42 for rotation therewith and respectively meshed with the teeth 36a and 40a of the internal gears 36 and 40. A pair of leaf springs 48 and 50 are mounted on the upper and lower sides of the hub portion 34a of the steering wheel 34. Each of the leaf springs 48 and 50 is fixedly attached at one end thereof to the hub portion 34a as by a screw 51 and is formed at the other end thereof with a curved or semi-circular finger 48a or 50a, as seen from FIG. 3, which is brought into contact with the pinion shaft 42 in a manner to partly surround same. The leaf springs 48 and 50 are constructed and arranged so as to urge the pinions 44 and 46 toward the teeth 36a and 40a of the internal gears 36 and 40 for thereby eliminating backlash between the same.

A steering wheel center pad 26 is mounted on the internal gear 36. Within the center pad 26 there is disposed an electric unit 52 which includes a plurality of switch buttons 54, 56 and 58 adapted to partly protrude outwardly from the center pad 26. The electric unit 52 is attached to the internal gear 36 by means of a bracket 60. Indicated by the reference numerals 62 and 64 in FIG. 3 are a pair of sliding contact arms which are mounted on the internal gear 36 and electrically each at one end thereof with concentric annular contact elements 66 and 68 mounted on the hub portion 34a and each at another end thereof with concentric annular contact elements 70 and 72 mounted on the internal gear 40, respectively.

Figure 4:
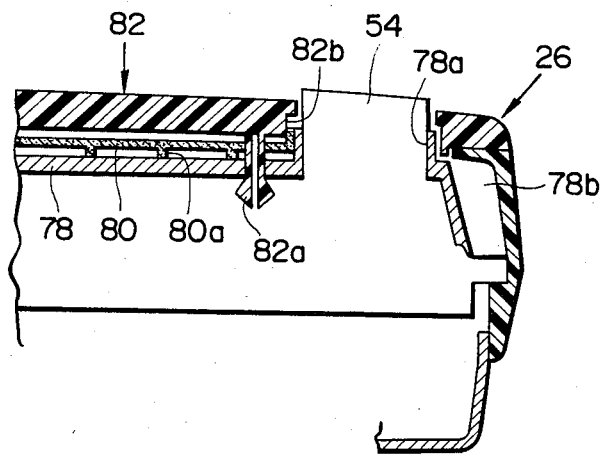
FIG. 4 is a fragmentary sectional view of details of a steering wheel center pad and its associated parts which may be employed in the steering system of FIG. 2.
Figure 5:
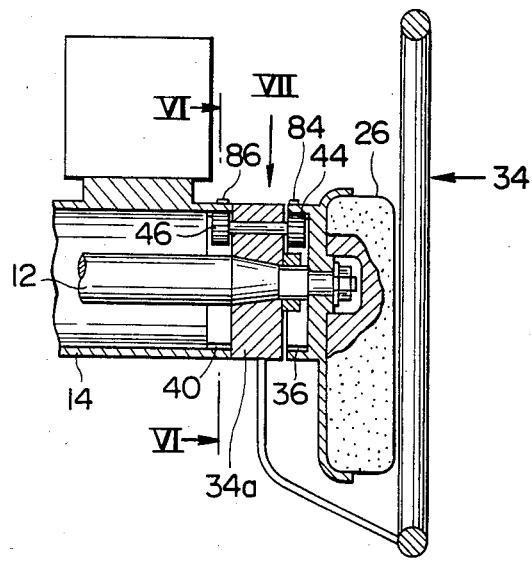
FIG. 5 is a fragmentary sectional view of a steering system equipped with an anti-rotation mechanism to which improvements on assembly are made.
Figure 6:
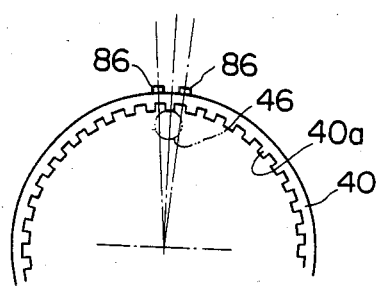
FIG. 6 is a fragmentary sectional view taken along the line VI—VI in FIG. 5.

The steering wheel center pad 26 and its associated parts may by arranged as shown in FIG. 4. In the drawing, indicated by the reference numeral 78 is a base bracket which is formed with an opening 78a for accommodation of the switch button 54 of the electric unit 52. A center pad element 80 has a plurality of ribs 80a contacting the base bracket 78. The center pad element 80 is sandwiched between the bracket 78 and a hard finisher 82 to which is applied a delustered finish or the like. The hard finisher 82 has a leg 82a through which it is attached to the base bracket 78 and an opening 82b where it accommodates therein the switch button 54 of the electric unit 52. The periphery of the opening 82b of the hard finisher 82 is so formed as to cooperate with the base bracket 78 to hold therebetween the periphery of the center pad element 80. Indicated by the reference numeral 78b is a rib of the base bracket 78.

In operation, rotation of the steering wheel 34 causes the pinions 44 and 46 to simultaneously rotate and turn about the steering shaft 12, allowing the internal gear 36 to be held stationary relative to the jacket 14. The steering wheel center pad 26 mounted on the internal gear 36 is thus held stationary irrespective of rotation of the steering wheel 34.

In this instance, there is no backlash between the internal gears 36 and 40 and the pinions 44 and 46 since they are always urged against each other by means of the leaf springs 48 and 50. By this, it becomes possible to install the steering wheel center pad 26 without any play. In this connection, it is to be understood that the steering system of the present invention is quite simple in structure and quite easy to assemble as compared with the prior art steering system and therefore can be produced with a reduced cost.

In assembly of the foregoing type steering system, there has been a difficulty in determining the angular position of the internal gear 36 relative to the column 12 or the internal gear 40. Such a difficulty can be overcome by the following improvements which will be described hereinafter with reference to FIGS. 5 to 7 in which parts corresponding to those of the previous embodiment are designated by the same reference numerals as their corresponding parts.

Figure 7:
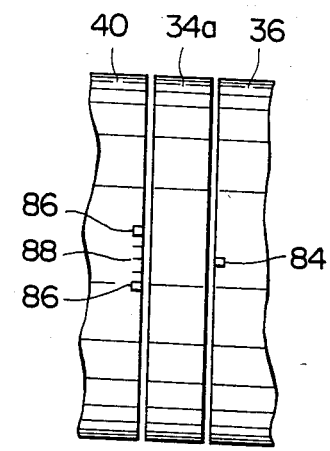
FIG. 7 is a view taken along the arrow VII of FIG. 5.

As best shown in FIG. 7, an internal gear 36 is formed with a reference mark 84 at a predetermined position on its outer circumferential surface. On the other hand, a column 14 or another internal gear 40 mounted thereon is formed on its outer circumferential surface with a pair of zone marks 86 and 86 indicating a zone or range in which the reference mark 84 is included when the internal gear 36 is correctly installed or installed with an angular position error less than allowance. The zone marks 86 and 86 are formed with an interval corresponding to the circular pitch of the teeth of the internal gear 36 as for example 4 mm in this embodiment. The zone indicated by the zone marks 86 and 86 may be divided into four sections by three gauge marks 88 for the convenience of knowing the angular position error with which the gear 36 is installed. The distance between the adjacent marks is therefore 1 mm in this embodiment. As seen from FIG. 6, each zone mark 86 is formed so as to be aligned with the center of the tooth space.

By the provision of such reference, zone and gauge marks 84, 86 and 88, installation of the internal gear 36 becomes easier and more accurate.

What is claimed is:

1. A steering system comprising:
   a stationary column;
   a steering shaft concentrically surrounded by said column;
   a steering wheel having a hub portion at which it is mounted on the upper end poriton of said steering shaft for rotation therewith;
   a pair of internal gears, one of which is provided to the hub portion of said steering shaft in a manner to be rotatable relative thereto and the other is provided to the upper end portion of said column in a fixed relation thereto;
   a pinion shaft;
   a pair of pinions mounted on said pinion shaft for rotation therewith;
   mounting means for mounting said pinion shaft on said hub portion of said steering wheel in a manner to allow said pinion to mesh with said internal gears while allowing the former to be movable toward and away from the latter; and
   spring means for resiliently urging said pinions toward said internal gears to eliminate backlash therebetween;
   in which said mounting means comprises a hole which is elongated radially of said steering wheel; and
   in which said spring means comprises a pair of leaf springs, each mounted at a first end thereof on the respective upper and lower sides of said hub portion of said steering wheel and each spring having at a second end thereof curved fingers contacting said pinion shaft in a manner to partly surround same.

2. A steering system comprising:
   a stationary column;
   a steering shaft concentrically surrounded by said column;
   a steering wheel having a hub portion at which it is mounted on the upper end portion of said steering shaft for rotation therewith;
   a pair of internal gears, one of which is provided to the hub portion of said steering shaft in a manner to be rotatable relative thereto and the other is provided to the upper end portion of said column in a fixed relation thereto;
   a pinion shaft;
   a pair of pinions mounted on said pinion shaft for rotation therewith;
   mounting means for mounting said pinion shaft on said hub portion of said steering wheel in a manner to allow said pinions to mesh with said internal gears while allowing the former to be movable toward and away from the latter; and
   spring means for resiliently urging said pinions toward said internal gears to eliminate backlash therebetween;
   in which said internal gears are respectively formed with alignment marks on the outer circumferential surfaces thereof for the convenience of determining a desired angular position of said one internal gear upon assembly.

* * * * *